(12) United States Patent
Ono

(10) Patent No.: US 8,307,807 B2
(45) Date of Patent: Nov. 13, 2012

(54) IDLE CONTROL DEVICE FOR ENGINE

(75) Inventor: Takahiko Ono, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 100 days.

(21) Appl. No.: 13/073,431

(22) Filed: Mar. 28, 2011

(65) Prior Publication Data

US 2012/0145123 A1 Jun. 14, 2012

(30) Foreign Application Priority Data

Dec. 14, 2010 (JP) ................................ 2010-277958

(51) Int. Cl.
*F02D 1/00* (2006.01)

(52) U.S. Cl. ........... 123/339.1; 123/339.11; 123/406.16; 123/406.23

(58) Field of Classification Search ............... 123/339.1, 123/339.11, 309.12, 309.19, 406.23, 406.11, 123/406.16
See application file for complete search history.

(56) References Cited

U.S. PATENT DOCUMENTS

| 5,392,748 | A | 2/1995 | Azuma et al. |
| 5,481,461 | A * | 1/1996 | Miyamoto et al. ............... 701/99 |
| 6,513,488 | B2 * | 2/2003 | Enoki et al. ................... 123/305 |
| 8,229,647 | B2 * | 7/2012 | Ichihara et al. ............... 701/102 |

FOREIGN PATENT DOCUMENTS

| JP | 3435760 B2 | 8/2003 |
| JP | 3556682 B2 | 8/2004 |

* cited by examiner

*Primary Examiner* — John Kwon
(74) *Attorney, Agent, or Firm* — Sughrue Mion, PLLC

(57) ABSTRACT

An idle control device for an engine is provided that can prevent delay in return to a target revolution speed which may cause unpleasant vehicle vibration or lead to an engine stall.

3 Claims, 10 Drawing Sheets

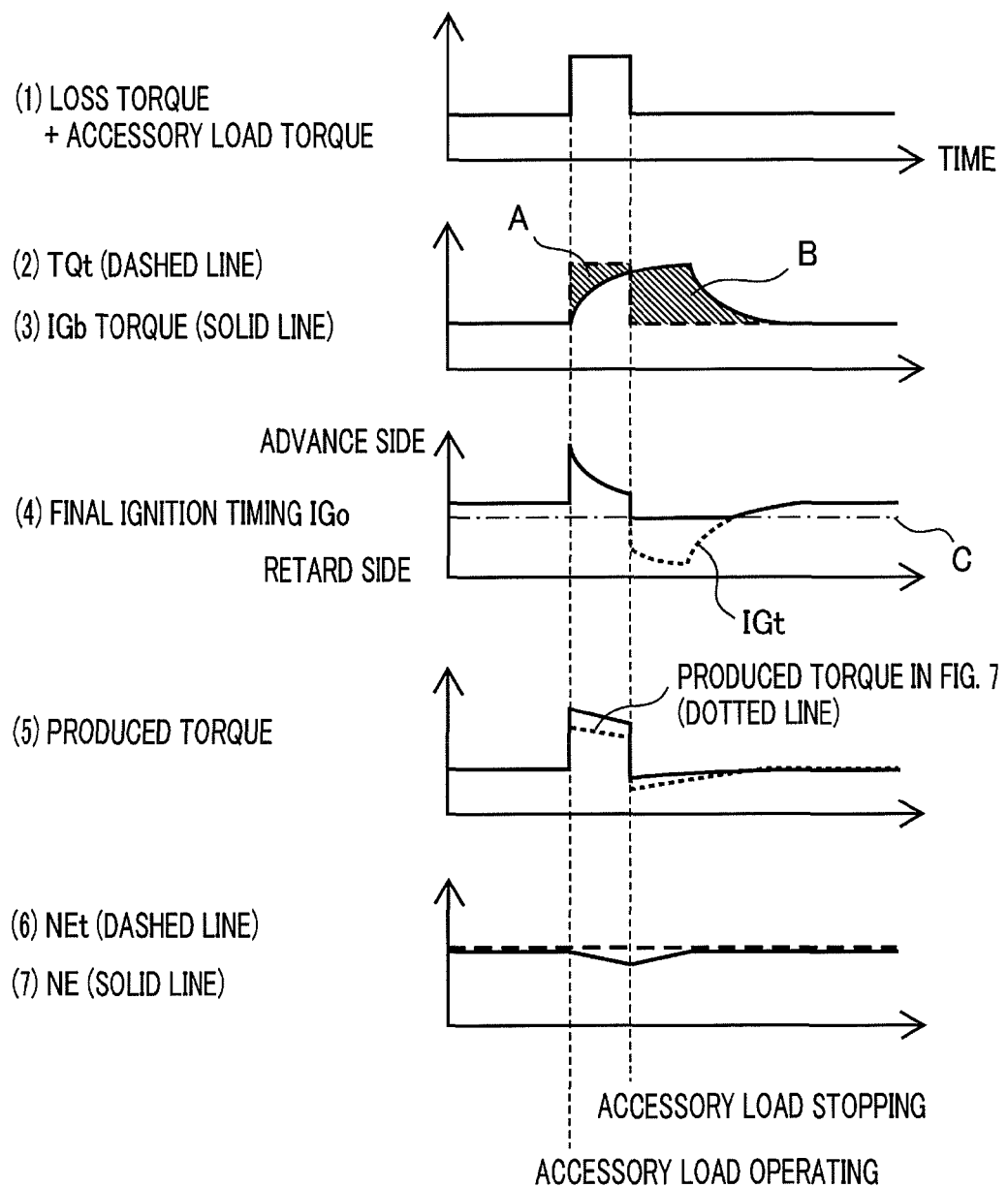

RETARD SIDE ← IGNITION TIMING → ADVANCE SIDE

RETARD SIDE ← IGNITION TIMING → ADVANCE SIDE

IDLE CONTROL DEVICE FOR ENGINE

BACKGROUND OF THE INVENTION

1. Field of the Invention

The present invention relates to an idle control device for an engine, and in particular to an idle control device using torque-based control.

2. Description of the Related Art

In engine control devices of the recent years, a method of controlling an engine called "torque-based control" has been getting popular, in which torque produced by the engine is controlled based on a torque index, as described in Patent Document 1, for example.

In such torque-based control as described above, target torque of the engine is determined based on the quantity of stepping on an accelerator pedal by a driver, the opening degree of a throttle valve is controlled so that the engine draws in an air volume capable of producing the target torque, and an ignition coil is controlled at an ignition timing capable of realizing the target torque with an actual intake air volume detected by an air flow sensor, whereby output power from the engine is controlled to produce the target torque, so as to realize running performance requested by the driver.

Moreover, when the accelerator pedal is not stepped on, that is, when the engine is in idling, the total of loss torque of the engine (mechanical loss and pump loss) and that of accessory loads (such as an alternator and an air conditioner) are determined to be the target torque, the opening degree of the throttle valve is controlled so that the engine draws in the air volume capable of producing the target torque, and the ignition coil is controlled at an ignition timing capable of realizing the target torque with the actual intake air volume detected by the air flow sensor, whereby the output power from the engine is controlled to produce the target torque, so as to realize a target revolution speed.

In the torque-based control as described above, in the computing process, the target torque needs to be converted into the intake air volume and the ignition timing; the conversion methods therefor are such that "ignition-timing-engine-torque characteristics" that have been measured in advance on the basis of an internal combustion engine operation state (a revolution speed and an intake air volume into the cylinder) are stored as map data in the memory of the control device, and then the intake air volume is obtained from the torque, the revolution speed and the ignition timing, or the ignition timing is obtained from the torque, the revolution speed and the intake air volume.

However, the relationship between the ignition timing and the torque is characterized as approximating a quadratic function; therefore, the farther an actual ignition timing is set from the ignition timing that gives the maximum engine torque (the vertex of the quadratic function; referred to as the MBT ignition timing), that is, the farther it is set from the vertex of the quadratic function, the wider a torque variation range tends to become relative to an ignition timing variation range.

An example of "ignition-timing-torque characteristics" is shown in FIG. 9 for reference.

In FIG. 9, when a change or shift of an ignition timing $\Delta IG$ occurs at an ignition timing relatively close to the MBT ignition timing, a torque change or torque shift of $\Delta T2$ occurs. Meanwhile, when the change or shift of the ignition timing $\Delta IG$ occurs at an ignition timing relatively far from the MBT ignition timing, a torque change or torque shift of $\Delta T1$ ($>\Delta T2$) occurs.

As described above, it is understood that the farther the ignition timing shifts from the MBT ignition timing, that is, the more the ignition timing is set toward the retard side, the more the torque shift expands attributed to the "ignition-timing-torque characteristics."

Moreover, as changes in the characteristics of various parts progress over time, a discrepancy between the "ignition-timing-torque characteristics" stored in advance in the memory of the control device and "ignition-timing-produced-torque characteristics" as actual engine characteristics becomes greater; therefore, a discrepancy between torque actually produced by the engine and the target torque increases even at the same ignition timing.

When an air volume is calculated under such conditions, from torque, a revolution speed and an ignition timing in idling, if the air volume calculated from the map data of the "ignition-timing-torque characteristics" is larger than a necessary volume, actual torque becomes excessive, so that the revolution speed increases exceeding a target idle revolution speed, whereas, if the air volume calculated from the map data of the "ignition-timing-torque characteristics" is smaller than the necessary volume, the actual torque becomes short, so that the revolution speed becomes lower than the target idle revolution speed.

Moreover, when an ignition timing is calculated from the torque, the revolution speed and the air volume, if the ignition timing calculated from the map data of the "ignition-timing-torque characteristics" is advanced too much, the actual torque becomes excessive, so that the revolution speed increases exceeding the target idle revolution speed, whereas, if the ignition timing calculated from the map data of the "ignition-timing-torque characteristics" is retarded too much, the actual torque becomes short, so that the revolution speed becomes lower than the target idle revolution speed.

However, in either of the cases described above, by providing additional control such as PID control based on a revolution deviation of the actual revolution speed from the target revolution speed and by adding to the target torque a correction value based on the revolution deviation of the actual revolution speed from the target revolution speed, excess or shortage of actually produced torque is fed back and corrected so that the intake air volume is increased or decreased; however in particular, when the ignition timing is greatly shifted toward the retard side, the revolution speed decreases so much that return to the target revolution speed will be delayed, which raises concern in that unpleasant engine noise arises, or in the worst case, the engine might be led to a stall.

That is to say, when a discrepancy arises in the "ignition-timing-torque characteristics," if the ignition timing is normally advanced in response to a reduction in the revolution speed so as to increase torque, the return to the target revolution speed can be brought forward; however, in the torque-based control described above, an ignition timing to achieve the target torque is set based on the actual intake air volume, and an increase in engine torque to compensate the reduction in revolution speed is not directly reflected on the ignition timing, so that the increase in the engine torque is delayed, thereby delaying the return to the target revolution speed.

As countermeasures against the above-described problems, there are known a method of setting a predetermined restriction position in advance and making the ignition timing not be set in the retard side beyond the predetermined restriction position, as described in Patent Document 2, and another method of making the ignition timing not be shifted toward the retard side when the revolution speed is lowered beyond the target idle revolution speed, as described in Patent Document 3. However, even if those methods described in Patent Document 2 and 3 are unchangingly implemented in the above-described torque-based control, delay in the return to the target revolution speed is not resolved for reasons as below.

Patent Document 1: Japanese Patent No. 3627464
Patent Document 2: Japanese Patent No. 3556682
Patent Document 3: Japanese Patent No. 3435760

The above-described torque-based control is configured in such a way that when the target torque becomes unable to be realized at an ignition timing computed based on the intake air volume, excess or shortage of the target torque that becomes unable to be realized at the ignition timing is controlled to be fed back to the target air volume. Therefore, if the ignition timing is restricted before retarded to a target value, the target torque is corrected so that the target intake air volume is corrected toward a decreasing side, and resultantly, regardless of the ignition timing being restricted from shifting toward the retard side, the intake air volume is controlled to change toward the decreasing side, so that torque that cannot be realized at the ignition timing (difference between torque able to be produced at the target ignition timing and that able to be produced at the restricted ignition timing) is increased late, which has caused a problem in that delay in the return to the target revolution speed cannot be resolved.

SUMMARY OF THE INVENTION

The present invention has been made to cope with the matter described above, and aims at providing an idle control device for an engine that can prevent problems in that an target ignition timing calculated based on an intake air volume controlled in accordance with target torque becomes a value in the retard side, regardless of a revolution speed in idling being lower than a target revolution speed, due to a discrepancy between "ignition-timing-torque characteristics" that have been stored in the idle control device and actual engine characteristics, so that return to the target revolution speed is delayed, thereby causing unpleasant vehicle vibration or leading to an engine stall.

An idle control device for an engine according to the present invention comprises: an idle detection means for detecting that the engine is in an idle state; a revolution speed detection means for detecting a revolution speed of the engine; a target revolution speed computing means for computing a target revolution speed when the engine is in the idle state; an intake air volume detection means for detecting an intake air volume the engine draws in; a target torque computing means for computing target torque when the engine is in the idle state; a target ignition timing computing means for computing, based on the revolution speed, the intake air volume and the target torque, a target ignition timing for producing the target torque with the intake air volume; an ignition timing variation restriction means for setting an ignition timing restriction value by which variation in the target ignition timing is restricted based on the revolution speed, the target revolution speed and the target torque, and for determining an ignition timing after restricted by the ignition timing restriction value to be a final ignition timing; a high-speed response torque control means for driving an ignition coil in a controlled manner so that a spark is started by a spark plug at the final ignition timing; a target ignition timing torque computing means for computing, based on the revolution speed, the intake air volume and the target ignition timing, target ignition timing torque produced at the target ignition timing; a torque ratio computing means for computing a ratio (torque ratio) of the target ignition timing torque to the target torque; a target torque for low-speed response computing means for computing target torque for low-speed response based on the target torque and the torque ratio; a basic ignition timing computing means for computing a basic ignition timing determined according to an operation state of the engine; a target intake air volume computing means for computing, based on the target torque for low-speed response, the revolution speed and the basic ignition timing, a target intake air volume for producing the target torque for low-speed response; and a low-speed response torque control means for controlling the opening degree of a throttle valve so that the intake air volume coincides with the target intake air volume.

An idle control device for an engine according to the present invention can prevent the problems in that the target ignition timing calculated based on the intake air volume controlled in accordance with the target torque becomes a value in the retard side, regardless of the revolution speed in idling being lower than the target revolution speed, due to a discrepancy between the "ignition-timing-torque characteristics" that have been stored in the idle control device and "ignition-timing-torque characteristics as the actual engine characteristics, so that return to the target revolution speed is delayed, thereby causing unpleasant vehicle vibration or leading to an engine stall.

Various modifications and alterations of this invention will be apparent to those skilled in the art without departing from the scope and spirit of this invention, and it should be understood that this is not limited to the illustrative embodiments set forth herein.

BRIEF DESCRIPTION OF THE DRAWINGS

FIG. 4 is a timing chart for explaining the operation of the idle control device according to Embodiment 1 of the invention;

DETAILED DESCRIPTION OF THE PREFERRED EMBODIMENTS

Hereinafter, a preferred embodiment of an idle control device for an engine according to the present invention will be explained referring to the accompanied drawings.

Embodiment 1

Figure 1:
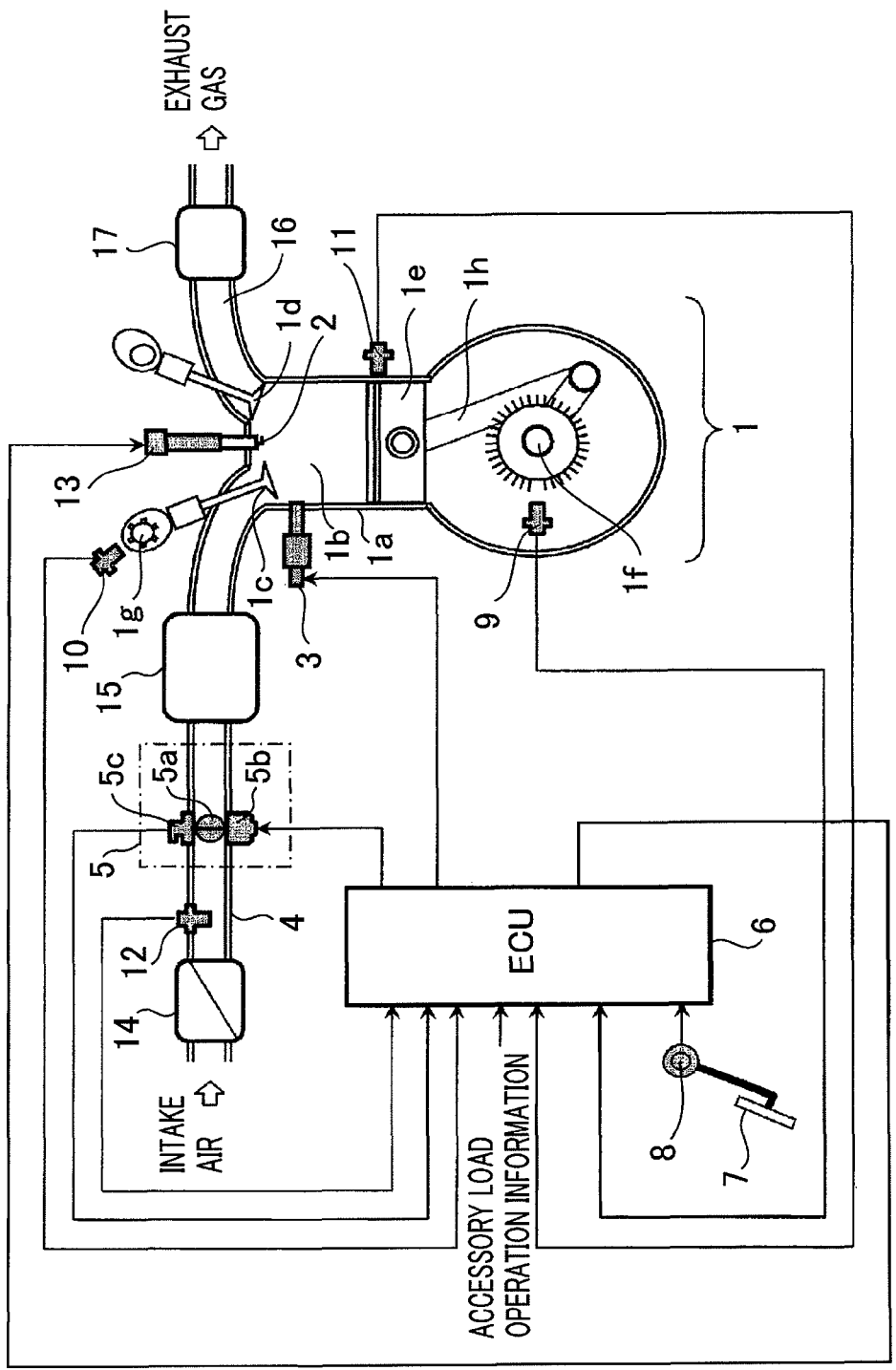
FIG. 1 is a complete-configuration diagram of an engine and an idle control device according to Embodiment 1 of the present invention.

FIG. 1 is a complete-configuration diagram of an engine and an idle control device therefor according to Embodiment 1 of the present invention. In FIG. 1, an intake valve 1c, an exhaust valve 1d and a piston 1e are provided in a combustion chamber 1b of a cylinder 1a in the engine 1, and in addition, a spark plug 2 and a fuel injection valve 3 are also provided facing the inside of the combustion chamber 1b. Moreover, an electronic control throttle 5 is provided in an intake air passage 4 of the engine 1, by which the volume of intake air is adjusted. The electronic control throttle 5 includes a throttle valve 5a, a motor 5b that drives the valve and a throttle opening degree sensor 5c that detects the opening degree of the throttle valve 5a.

An engine control unit 6 (hereinafter referred to as an ECU) obtains an output signal from an accelerator position sensor 8 that detects an operation quantity of an accelerator pedal 7, transmits to the motor 5b a control signal, and controls based on a throttle valve opening degree signal the throttle valve 5a to come to an appropriate opening degree. A crank angle sensor 9 detects a crank angle of a crank shaft 1f; a cam angle sensor 10 detects a cam angle of a cam shaft 1g in the intake air side; and a water temperature sensor 11 detects a temperature of cooling water of the engine 1.

The ECU 6 obtains output signals each from the accelerator position sensor 8, the crank angle sensor 9, the cam angle sensor 10, an air flow sensor 12, the water temperature sensor 11, and not-shown other various sensors, so as to determine an ignition timing, a fuel injection volume and the like. And then, the ECU, base on each of those determined values, drives the fuel injection valve 3 to inject and supply fuel into the combustion chamber 1b, and also drives an ignition coil 13 connected to the spark plug 2, thereby igniting a spark from the plug gap of the spark plug 2.

After a flow volume of the intake air, from which grit and dust have been removed by an air cleaner 14, is measured by the air flow sensor 12, the intake air passes through the electronic control throttle 5, is led to a surge tank 15, and then, via the intake air valve 1c, led to the combustion chamber 1b from the surge tank 15. The intake air drawn into the combustion chamber 1b and the fuel injected from the fuel injection valve 3 are mixed together to form an air-fuel mixture, and ignited to combust by the spark from the spark plug 2.

Combustion pressure from the air-fuel mixture is transmitted to the piston 1e to reciprocate the piston. The reciprocation motion of the piston 1e is transmitted to the crank shaft 1f via a connecting rod 1h, converted thereby into revolution motion, and then taken out as output power from the engine 1. After the combustion, the air-fuel mixture is turned into exhaust gas, led to an exhaust manifold 16 via the exhaust valve 1d, purified by a catalyst 17, and then exhausted into the air.

Figure 2A:
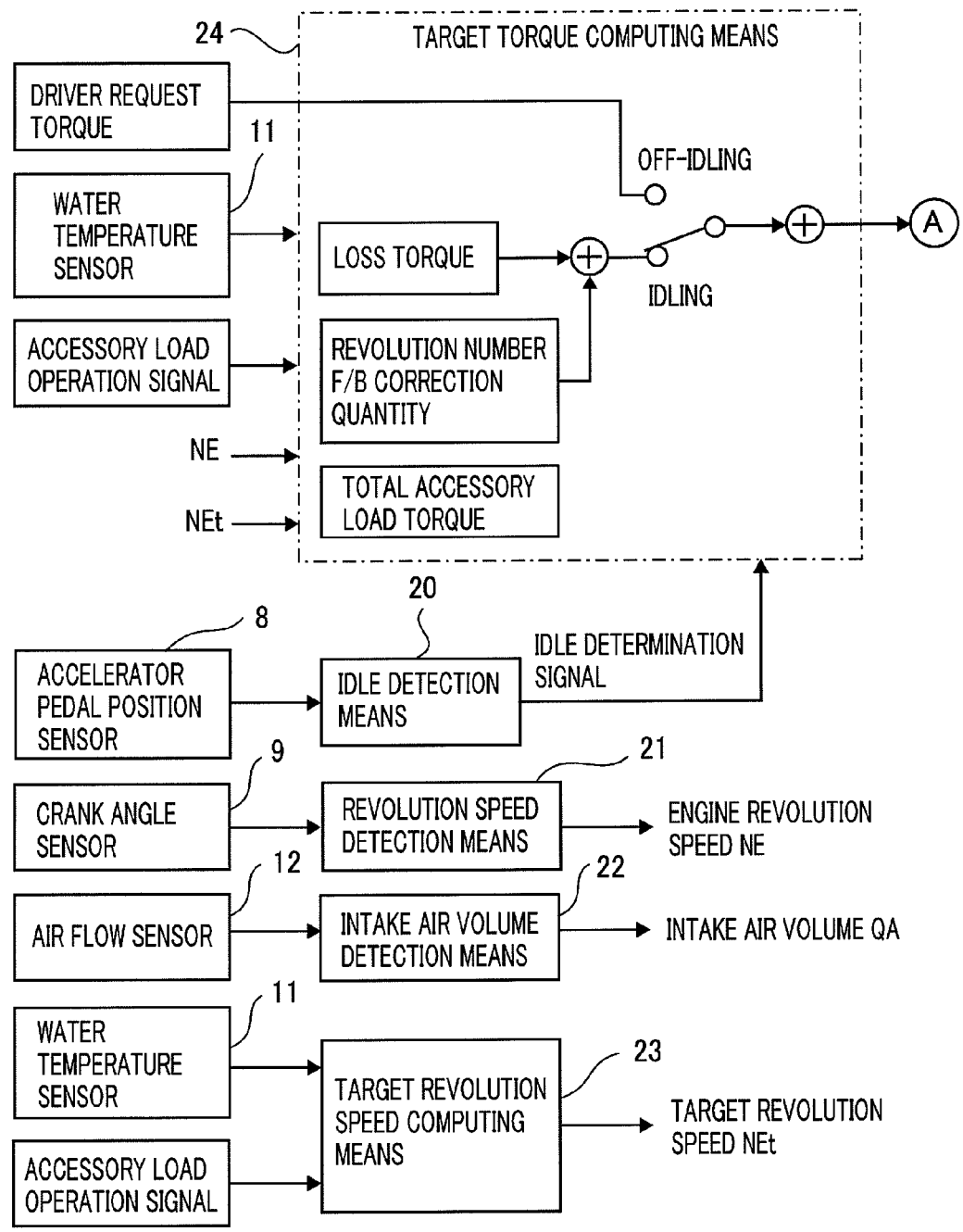
FIG. 2A and FIG. 2B each are a functional block diagram of the idle control device according to Embodiment 1 of the invention.

Next, the control function of the idle control device for the engine according to Embodiment 1 will be explained in detail, referring to the functional block diagram in FIG. 2A and FIG. 2B. Here, the control function of the idle control device has been programmed in the ECU 6 shown in FIG. 1 described above.

The operation quantity of the accelerator pedal 7 detected by the accelerator position sensor 8 is input to an idle detection means 20. When the operation quantity of the accelerator pedal 7 is zero (when the driver does not step on the accelerator pedal), the idle detection means determines that the engine 1 is in an idle state, so as to output an idle determination signal.

A revolution speed detection means 21, to which a pulse signal detected by the crank angle sensor 9 is input, detects an engine revolution speed NE that is a revolution speed of the crank shaft 1f. An intake air volume detection means 22, to which the output signal from the air flow sensor 12 is input, detects an intake air volume QA.

A target revolution speed computing means 23, to which are input operation signals from accessory loads (not shown in the figure) such as an alternator and an air conditioner, as well as information on the cooling water temperature of the engine 1 detected by the water temperature sensor 11, computes an optimum target revolution speed NEt for idling.

A target torque computing means 24, to which are input the operation signals from the accessory loads (not shown in the figure) such as the alternator and the air conditioner, the idle determination signal determined by the idle detection means 20, the engine revolution speed NE detected by the revolution speed detection means 21 and the target revolution speed NEt determined by the target revolution speed computing means 23, as well as the information on the cooling water temperature of the engine 1 detected by the water temperature sensor 11, computes based on the information above loss torque (total of mechanical loss and pump loss) when engine 1 revolves at the target revolution speed NEt. And then, a revolution number F/B (feedback) correction quantity, which is a correction value obtained by executing a PID operation based on a deviation of the engine revolution speed NE from the target revolution speed NEt, and the total torque of the accessory loads are added to the computed result, so that target torque TQt is determined.

In addition, when off-idling, the total torque of the accessory loads is added to driver-request torque determined based on, for example, the operation quantity of the accelerator pedal 7 and the engine revolution speed NE, and then the target torque TQt is determined.

A target ignition timing computing means 25, to which are input the engine revolution speed NE detected by the revolution speed detection means 21, the intake air volume QA detected by the intake air volume detection means 22 and the target torque TQt computed by the target torque computing means 24, computes based on the input information above a target ignition timing IGt.

Here, among four parameters including the revolution speed, the intake air volume, the torque and the ignition timing, three of them, the revolution speed NE, the intake air volume QA and the target torque TQt, are known. Those known parameters are checked against map data stored in the memory in the control device, whereby the target ignition timing IGt that is an unknown parameter can be obtained.

An ignition timing variation restriction means 26, to which are input the target ignition timing IGt computed by the target ignition timing computing means 25, the engine revolution speed NE detected by the revolution speed detection means 21 and the target revolution speed NEt determined by the target revolution speed computing means 23, sets an ignition timing restriction value by which variation of the target ignition timing IGt is restricted based on the engine revolution speed NE and the target revolution speed NEt, and determines an ignition timing whose variation has been restricted by the ignition timing restriction value to be a final ignition timing IGo.

A high-speed response torque control means 27, to which the final ignition timing IGo determined by the ignition timing variation restriction means 26 is input, controls timing of driving the ignition coil 13 so that a spark is started by the ignition plug 2 at the final ignition timing IGo.

A target ignition timing torque computing means 28, to which are input the engine revolution speed NE detected by the revolution speed detection means 21, the intake air volume QA detected by the intake air volume detection means 22 and the target ignition timing IGt computed by the target ignition timing computing means 25, computes based on the information above target ignition timing torque TQs produced at the target ignition timing IGt.

Here, among four parameters including the revolution speed, the intake air volume, the torque and the ignition timing, three of them, the revolution speed NE, the intake air volume QA and the target ignition timing IGt, are known. Those known parameters are checked against the map data stored in the memory of the control device, whereby the target ignition timing torque TQs that is an unknown parameter can be obtained.

A torque ratio computing means 29, to which are input the target torque TQt computed by the target torque computing means 24 and the target ignition timing torque TQs computed by the target ignition timing torque computing means 28, computes a ratio TR (torque ratio) of the target ignition timing torque TQs to the target torque TQt.

Here, the torque ratio TR is computed by TR=TQs/TQt, and takes values as follows: when TQt=TQs, TR=1.0; when TQt>TQs, 0<TR<1.0; and when TQt<TQs, TR>1.0.

A target torque for low-speed response computing means 30, to which are input the target torque TQt computed by the target torque computing means 24 and the torque ratio TR computed by the torque ratio computing means 29, computes based on the target torque TQt and the torque ratio TR a target torque for low-speed response TQa.

Here, the target torque for low-speed response TQa is computed by TQa=TQt/TR, and takes values as follows: when TR=1.0, TQa=TQt; when 0<TR<1.0, TQa>TQt; and when R>1.0, TQa<TQt.

That is to say, when the target ignition timing torque TQs does not reach the target torque TQt, the target torque for low-speed response TQa takes a value increased to larger than the target torque TQt, whereas when the target ignition timing torque TQs becomes excessive relative to the target torque TQt, the target torque for low-speed response TQa takes a value decreased to smaller than the target torque TQt.

A basic ignition timing computing means 31, to which is input information indicating engine operation states, such as the engine revolution speed NE detected by the revolution speed detection means 21 and the intake air volume QA detected by the intake air volume detection means 22, computes based on the information a predetermined basic ignition timing IGb.

A target intake air volume computing means 32, to which are input the target torque for low-speed response TQa computed by the target torque for low-speed response computing means 30, the engine revolution speed NE detected by the revolution speed detection means 21 and the basic ignition timing IGb computed by the basic ignition timing computing means 31, computes based on the information above a target intake air volume QAt.

Here, among four parameters including the revolution speed, the intake air volume, the torque and the ignition timing, three of them, the target torque for low-speed response TQa, the revolution speed NE and the basic ignition timing IGb are known; therefore, by checking those known parameters against the map data stored in the memory of the control device, the intake air volume QA that is an unknown parameter can be computed.

A low-speed response torque control means 33, to which are input the target intake air volume QAt computed by the target intake air volume computing means 32 and the intake air volume QA detected by the intake air volume detection means 22, controls the opening degree of the throttle valve 5a of the electronic control throttle 5 so that the intake air volume QA coincides with the target intake air volume QAt.

Next, the operation of the idle control device according to Embodiment 1 of the present invention will be explained referring to the flowchart in FIG. 3A and FIG. 3B.

Figure 3A:
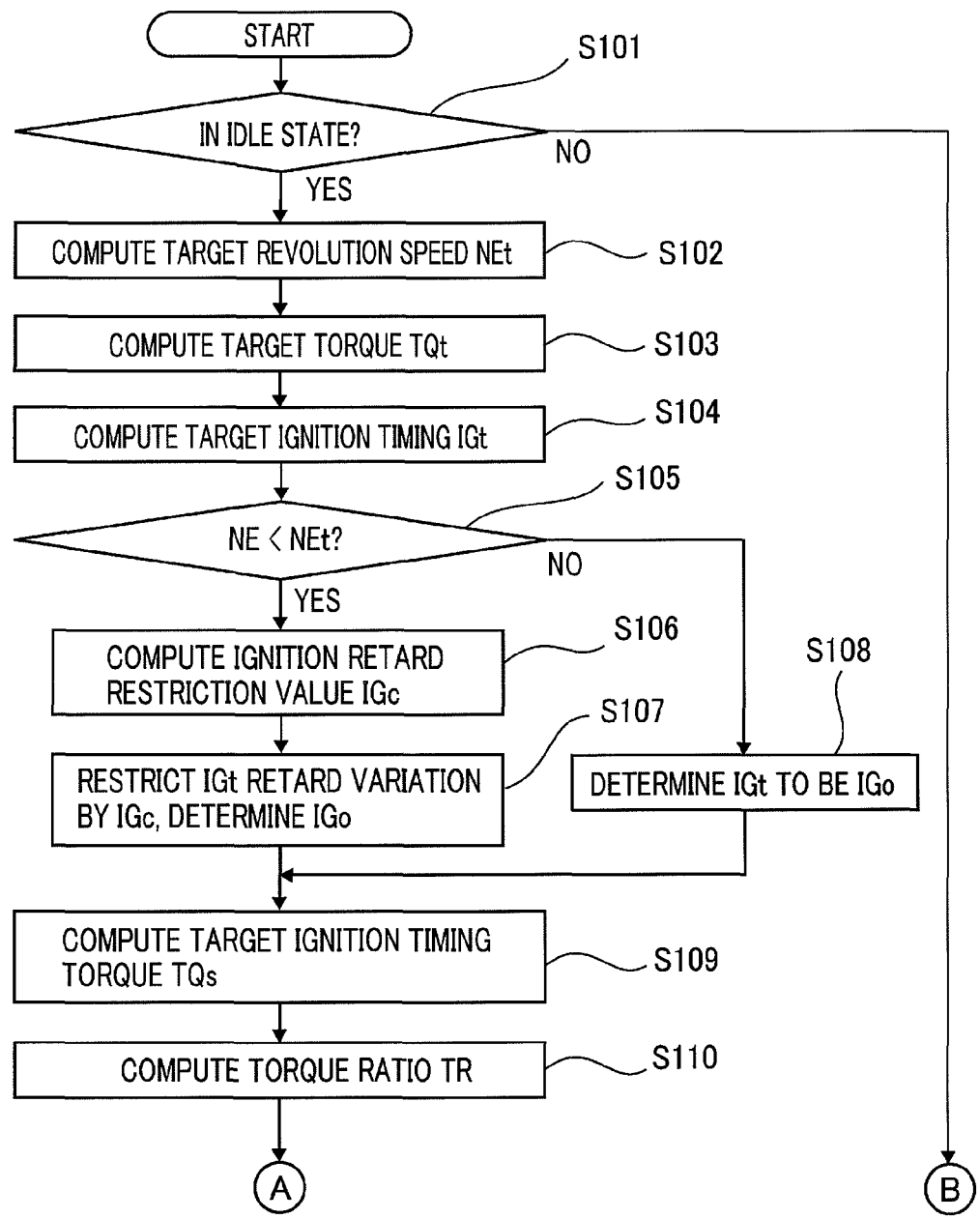
FIG. 3A and FIG. 3B each are a flowchart showing the operation of the idle control device according to Embodiment 1 of the invention.
Figure 3B:
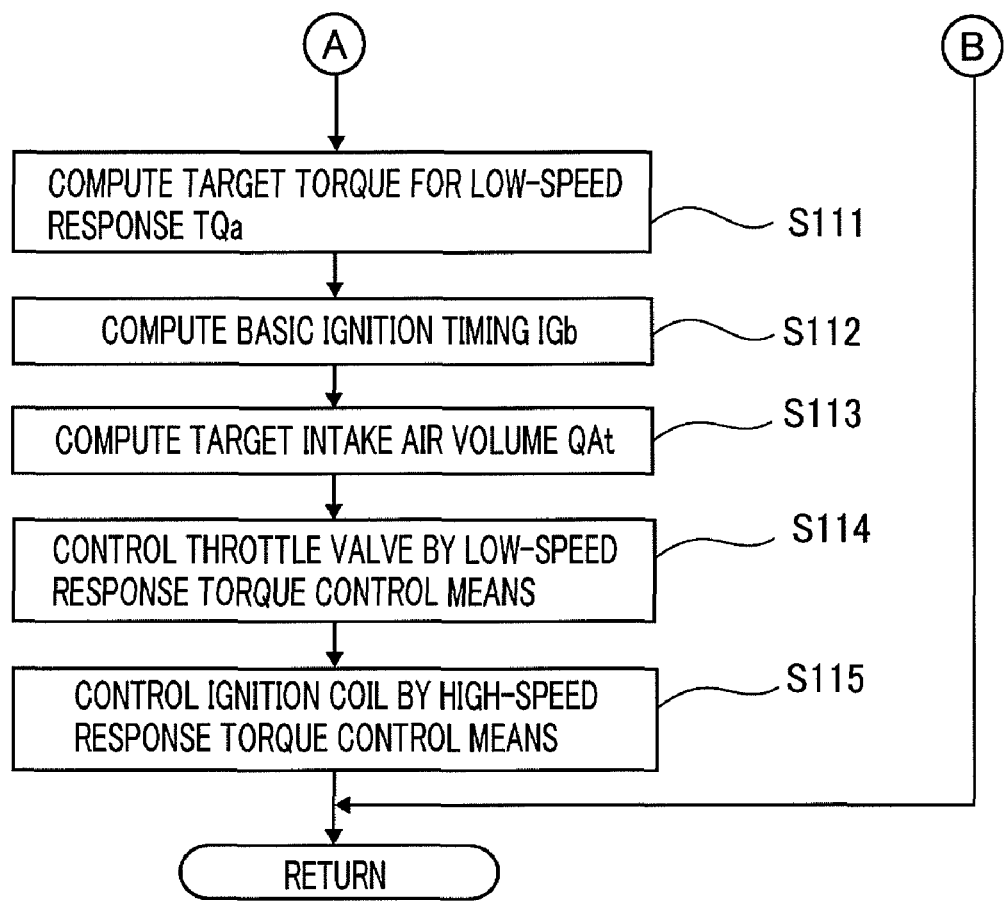

In FIG. 3A and FIG. 3B, although description of the steps of detecting various kinds of information, such as the operation quantity of the accelerator pedal 7, the revolution speed NE, the intake air volume QA, the cooling water temperature and the operation signals from accessory loads (not shown in the figure), is omitted here, the explanation will be made on the assumption that those kinds of information has already been stored in the RAM of ECU 6 in the preceding steps before the flowchart in FIG. 3A and FIG. 3B is executed.

In the first step, Step S101, the idle detection means 20 detects whether or not the engine is in the idle state. If the determination is YES (if idling is detected), Step S102 ensues from Step S101, whereas if it is NO, the following processing is skipped without doing anything.

If the determination is YES in Step S101 (if idling is detected), processing proceeds to S102, S103, S104 and S105, in this order.

In Step S102, the target revolution speed NEt is computed by the target revolution speed computing means 23; in Step S103, the target torque TQt is computed by the target torque computing means 24; in Step S104, the target ignition timing IGt is computed by the target ignition timing computing means 25; and then Step S105 ensues.

In Step S105, the ignition timing variation restriction means 26 firstly functions to determine whether or not the engine revolution speed NE detected by the revolution speed detection means 21 is lower than the target revolution speed NEt computed by the target revolution speed computing means 23.

If the determination is YES (if NE<NEt) here, Step S106 ensues from Step S105, whereas if it is NO (if NE≧NEt), Step S108 ensues from Step S105.

If the determination is YES in Step S105, Step S106 ensues from Step S105, an ignition timing variation restriction value IGc, which is set by the ignition timing variation restriction means 26 in order to restrict variation of the target ignition timing IGt shifting toward the retard side, is computed, and then Step S107 ensues. The ignition timing variation restriction value IGc by which the variation of the target ignition timing IGt is restricted is set in Step S107, a value in which the target ignition timing IGt is restricted from exceeding the ignition timing variation restriction value IGc is determined to be the final ignition timing IGo, and then Step S109 ensues.

Meanwhile, if the determination is NO in Step S105, Step S108 ensues from Step S105, the target ignition timing IGt computed in Step S104 is determined to be the final ignition timing IGo, and then Step S109 ensues.

In Step S109, the target ignition timing torque computing means 28 functions to compute, based on the engine revolution speed NE, the intake air volume QA and the target ignition timing IGt computed in Step S104, the target ignition timing torque TQs that can be realized at the target ignition timing IGt, and then Step S110 ensues.

In Step S110, the torque ratio computing means 29 functions to compute the torque ratio TR, which is the ratio of the target ignition timing torque TQs to the target torque TQt, from the target torque TQt computed in Step S103 and the target ignition timing torque TQs computed in Step S109, and then Step S111 ensues.

In Step S111, the target torque for low-speed response control means 30 functions to compute the target torque for low-speed response TQa from the target torque TQt computed in Step S103 and the torque ratio TR computed in Step S110, and then Step S112 ensues.

In Step S112, the basic ignition timing computing means 31 functions to compute the basic ignition timing IGb set in advance using the map data to which are input the revolution speed NE and the intake air volume QA, and then Step S113 ensues.

In Step S113, the target intake air volume computing means 32 functions to compute the target intake air volume QAt from the target torque for low-speed response TQa computed in Step S111, the revolution speed NE and the basic ignition timing IGb computed in Step S112, and then Step S114 ensues.

In Step S114, the low-speed response torque control means 33 functions to control the electronic control throttle 5 so that the intake air volume QA coincides with the target intake air volume QAt computed in Step S113.

And then in the final step, Step S115, the high-speed response torque control means 27 functions to control activation timing of the ignition coil 13 so that the spark is started from the spark plug 2 at the final ignition timing IGo determined in Step S107 to Step S108.

Figure 6:
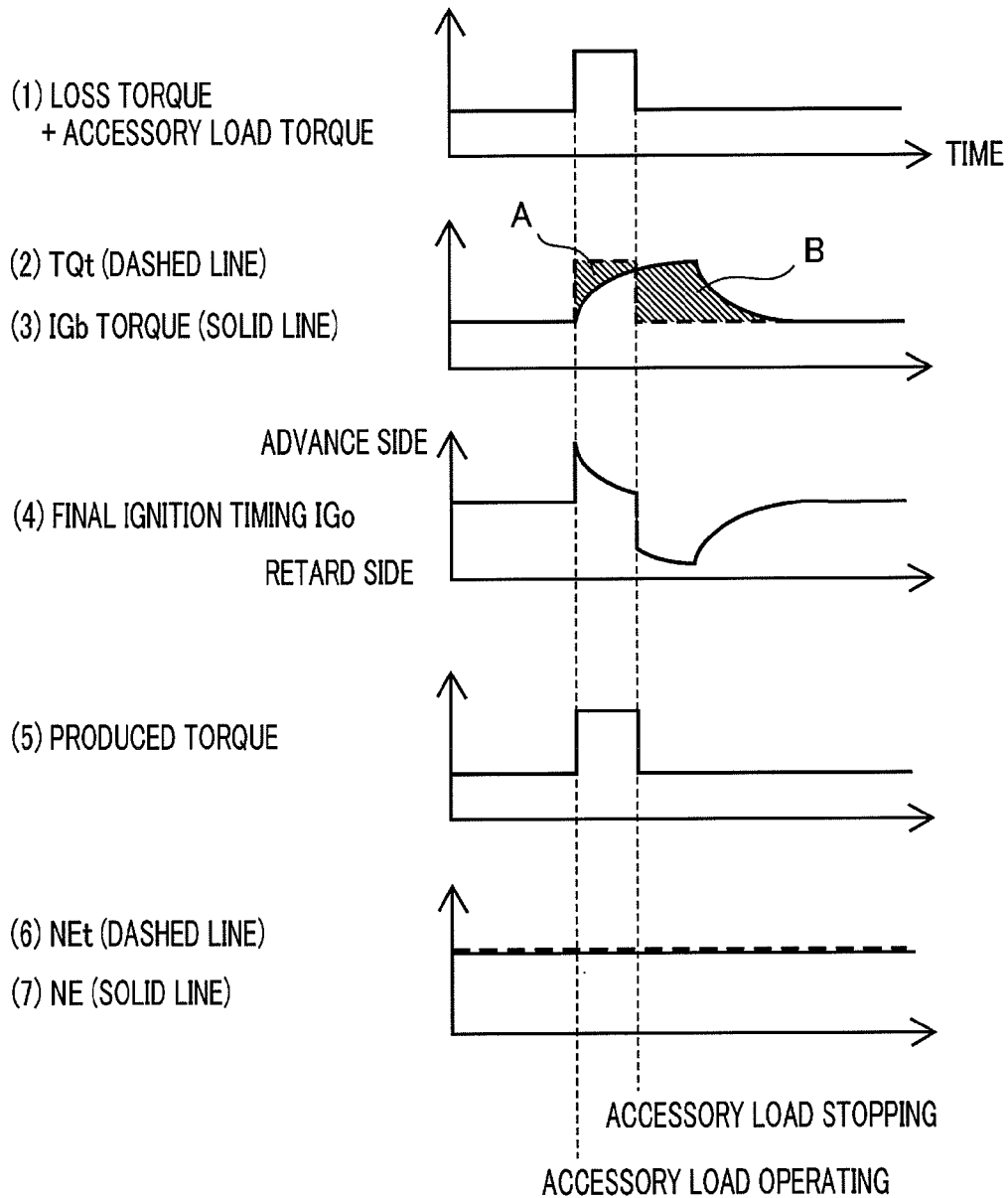
FIG. 6 is a timing chart for explaining the operation of a conventional device.
Figure 7:
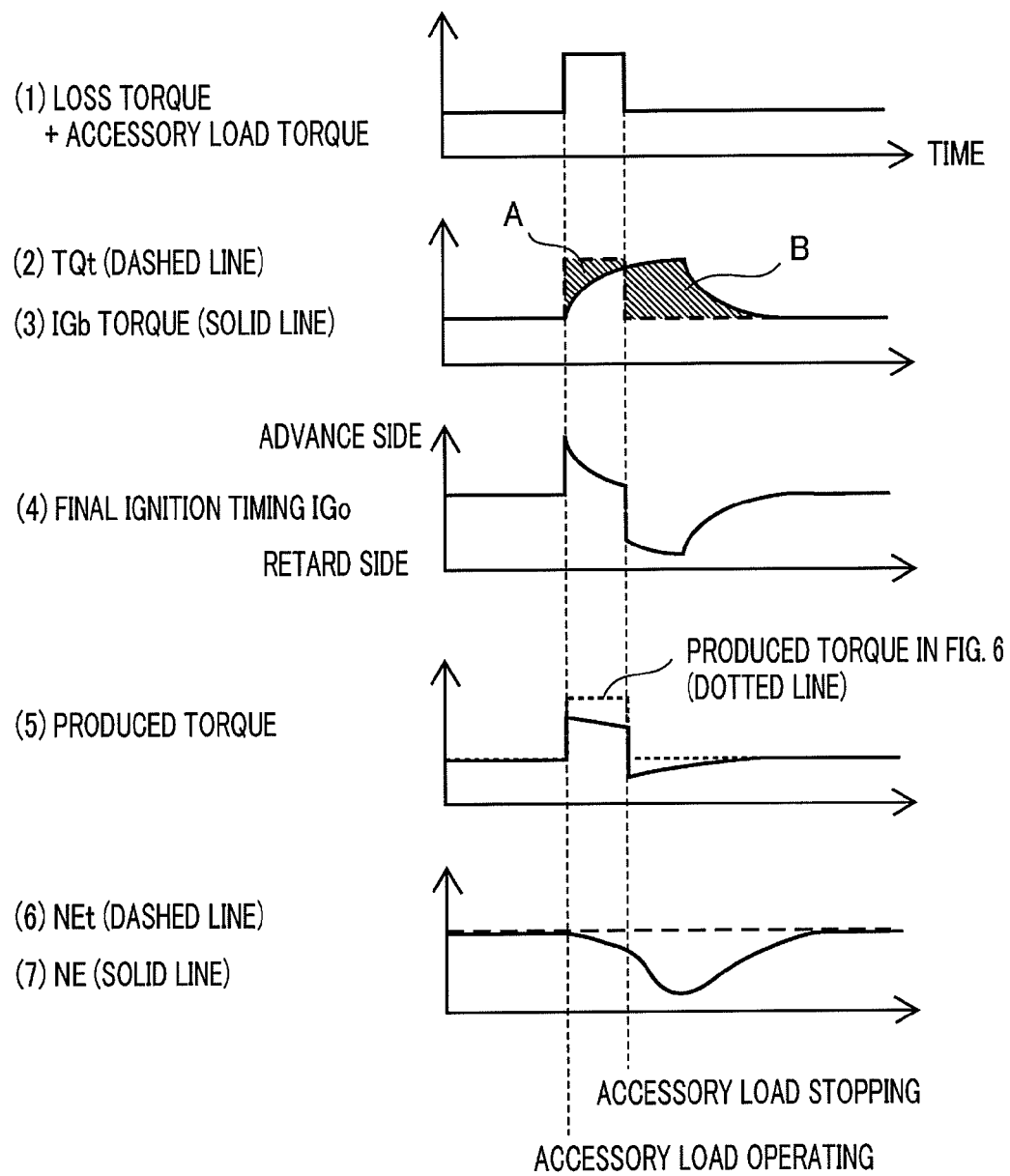
FIG. 7 is a timing chart for explaining problems with the conventional device.
Figure 8:
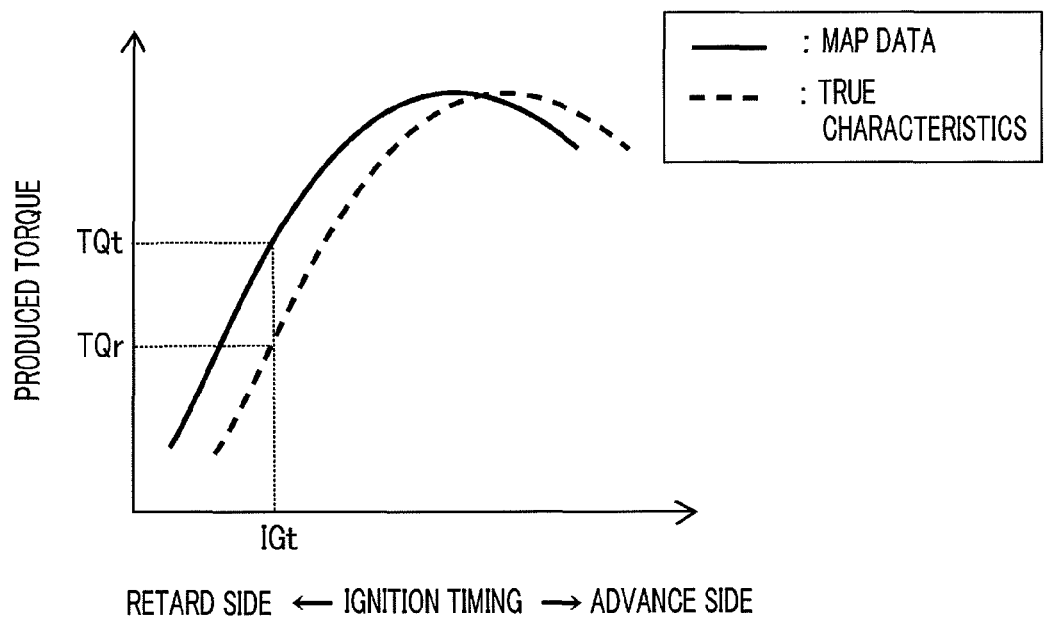
FIG. 8 is an explanatory diagram showing an example of "ignition-timing-torque characteristics" when a characteristic discrepancy occurs.
Figure 9:
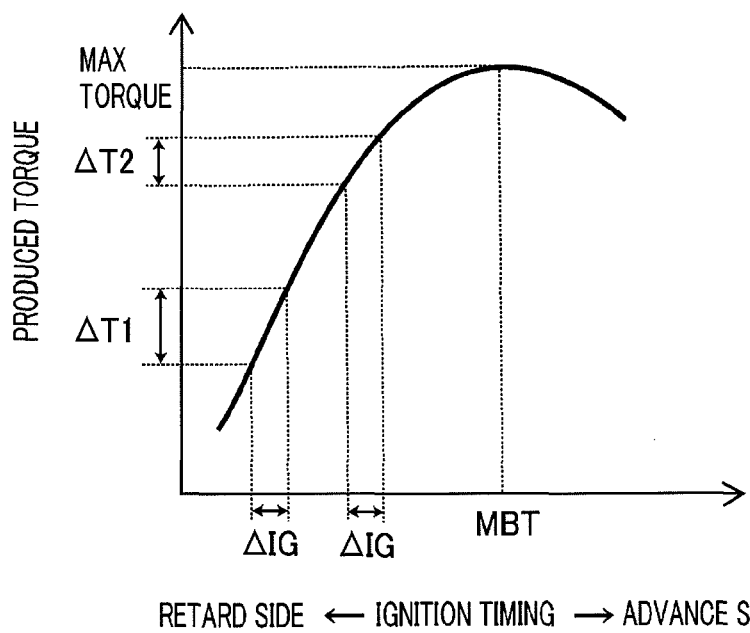
FIG. 9 is an explanatory diagram showing an example of "ignition-timing-torque characteristics."

Next, the operation of a conventional device and problems with the same that has no function of restricting the target ignition timing IGt by the ignition timing variation restriction means 26 will be supplementarily explained referring to FIG. 6, FIG. 7 and FIG. 8.

FIG. 6 is a timing chart showing the control operation of the conventional device in idling.

In the timing charts in FIG. 6 and FIG. 7, the following operation states (1) to (7) are described in descending order:
(1) Loss torque+accessory load torque
(2) Target torque TQt (dashed line)
(3) Torque realized at basic ignition timing IGb (solid line)
(4) Final ignition timing IGo
(5) Produced torque (torque actually produced by engine)
(6) Target revolution speed NEt (dashed line)
(7) Revolution speed NE (solid line)

FIG. 6 shows the control operation of the conventional device in which, for example, one of the accessory loads stops its operation immediately after starting the operation, under the conditions that there is no discrepancy between the "ignition-timing-torque characteristics" stored in the memory of the ECU 6 and actual "ignition-timing-torque characteristics."

In FIG. 6, when accessory load torque increases with the accessory load operating, the target torque TQt increases accordingly, which in turn increases the intake air volume (not shown in the figure); however, since there is a response delay in the intake air volume increase, torque realized by the basic ignition timing IGb becomes short relative to the target torque TQt (shown by the hatched portion A). However, the final ignition timing IGo (=the target ignition timing IGt) is advanced, whereby the shortage is offset with each other, and torque actually produced by the engine lags little and coincides with the target torque TQt, so that the revolution speed NE does not fluctuate but is maintained at the target revolution speed NEt.

Following the above, when the accessory load in operation stops and the accessory load torque thereby returns to the original value, the target torque TQt also returns to its original value accordingly, followed by decreasing of the intake air volume; however, since there is a response delay in the intake air volume decrease, torque realized at the basic ignition timing IGb becomes excessive relative to the target torque TQt (shown by the hatched portion B). However, the final ignition timing IGo (=the target ignition timing IGt) is retarded, whereby the excess is offset with each other, and torque actually produced lags little and coincides with the target torque TQt, so that the revolution speed NE does not fluctuate but is maintained at the target revolution speed NEt.

The following figure, FIG. 7, shows operation indicating the problem with the conventional device in which one of the accessory loads stops its operation immediately after starting the operation, under the conditions that there is a discrepancy between the "ignition-timing-torque characteristics" stored in the memory of the ECU 6 and the actual "ignition-timing-torque characteristics."

Now, the occurrence of the discrepancy between the "ignition-timing-torque characteristics" stored in the memory of the ECU 6 and the actual "ignition-timing-torque characteristics" means that, as shown in FIG. 8, for example, the map data (solid line) of the "ignition-timing-torque characteristics" stored in the memory of the ECU 6 does not coincide with the true characteristics (dashed line) that represent the relationship between ignition timing and torque after they have undergone changes due to fluctuation in the performance and characteristics of various parts.

In FIG. 8, when the target torque is set to TQt, for example, the target ignition timing IGt is computed and then the torque TQt is attempted to be realized; however, when the ignition timing is IGt, torque produced based on the true characteristics is TQr (<TQt), so that the produced torque becomes short, thereby lowering the revolution speed.

In FIG. 7, when accessory load torque increases with one of the accessory loads operating, the target torque TQt increases accordingly, which in turn increases the intake air volume (not shown in the figure); however, since there is a response delay in the intake air volume increase, torque realized at the basic ignition timing IGb becomes short relative to the target torque TQt (shown by the hatched portion A). However, although the final ignition timing IGo (=the target ignition timing IGt) is advanced and the shortage should be thereby offset with each other, since there is a discrepancy between the map data and the true characteristics in FIG. 7, differing from the casein FIG. 6, the torque TQr actually produced at the final ignition timing IGo (=the target ignition timing IGt) becomes somewhat less than the target torque TQt, thereby lowering the engine revolution speed NE.

Following the above, when the accessory load in operation stops and the accessory load torque thereby returns to the original value, the target torque TQt also returns to its original value accordingly, followed by decreasing of the intake air volume; however, since there is a response delay in the intake air volume decrease, air torque realized only by the intake air volume becomes excessive relative to the target torque TQt (shown by the hatched portion B). However, although the final ignition timing IGo (=target ignition timing IGt) is retarded and the excess should be thereby offset with each other, since here is a discrepancy between the map data and the true characteristics, the torque TQr actually produced at the final ignition timing IGo (=the target ignition timing IGt) becomes somewhat less than the target torque TQt, so that the engine revolution speed NE is further lowered to a large extent, and as raised in the above-described problem, return to the target engine revolution speed NEt is delayed, thereby causing unpleasant engine vibration, or in the worst case, leading to an engine stall.

Next, operation demonstrating effects of the idle control device according to Embodiment 1 employing variation restriction of the target ignition timing IGt by the ignition timing variation restriction means 26 will be explained using FIG. 4. The ignition timing variation restriction means 26 restricts, when the engine revolution speed NE is higher than the target engine revolution speed NEt, variation of the target ignition timing IGt shifting toward the advance side, whereas when it is lower than the target engine revolution speed NEt, restricts variation of the target ignition timing IGt shifting toward the retard side, and determines the resultant value to be the final ignition timing IGo.

In addition, the torque ratio is computed based on the target torque TQt and the target ignition timing torque TQs at the target ignition timing IGt, and the target torque for low-speed response TQa is set to be computed.

FIG. 4 is a timing chart for explaining the operation of the idle control device according to Embodiment 1, and in the figure are described operation states of the same items as those in FIG. 6 and FIG. 7.

Moreover, FIG. 4, as with FIG. 7, also shows the operation representing a case in which one of the accessory loads stops its operation immediately after starting the operation, under the conditions that there is a discrepancy between the "ignition-timing-torque characteristics" stored in the memory of the ECU 6 and the actual "ignition-timing-torque characteristics."

In FIG. 4, when accessory load torque increases with the accessory load operating, the target torque TQt increases accordingly, which in turn increases the intake air volume (not shown in the figure); however, since there is a response delay in the intake air volume increase, torque realized at the basic ignition timing IGb becomes short relative to the target torque TQt (shown by the hatched portion A).

However, although the target ignition timing IGt is advanced and the shortage should be thereby offset with each other, since there is a discrepancy between the map data and the true characteristics as with the case of FIG. 7, the actually produced torque at the final ignition timing IGo (=the target ignition timing IGt) becomes somewhat less resulting from effects of the characteristic discrepancy due to an increase in air volume, thereby lowering the revolution speed NE.

At this moment, although the target ignition timing IGt is shifted toward the advance side, since the engine revolution speed NE is lower than the target engine revolution speed NEt, variation of the target ignition timing IGt toward the advance side is not restricted by the ignition timing variation restriction means 26, and the actually produced torque is controlled based on the final ignition timing IGo (=the target ignition timing IGt).

Following the above, when the accessory load in operation stops and the accessory load torque thereby returns to the original value, the target torque TQt also returns to its original value accordingly, followed by decreasing of the intake air volume. However, since there is a response delay in the intake air volume decrease, the air torque realized only by the intake air volume becomes excessive relative to the target torque TQt (shown by the hatched portion B). At this moment, although the target ignition timing IGt is shifted toward the retard side as with FIG. 7, since the engine revolution speed NE is lower than the target engine revolution speed NEt, the final ignition timing IGo is restricted to an ignition timing restriction value in which variation of the target ignition timing IGt toward the retard side is restricted by the ignition timing variation restriction means 26 (dashed-dotted line C in FIG. 4), torque shortage due to the characteristic discrepancy is improved, and as a result, the engine revolution speed NE is prevented from decreasing to a large extent.

As has been explained in Step S107 in FIG. 3A, the ignition timing variation restriction value IGc in FIG. 4 is set as a fixed value C by which variation of the target ignition timing IGt is restricted; however, the less the revolution speed reduction is, the more the value is made to shift toward the retard side, whereas the more the revolution speed reduction is, the more the value is made to shift toward the advance side, whereby convergence on the target engine revolution speed NEt can be further optimized depending on the reduction of the engine revolution speed.

Figure 5:
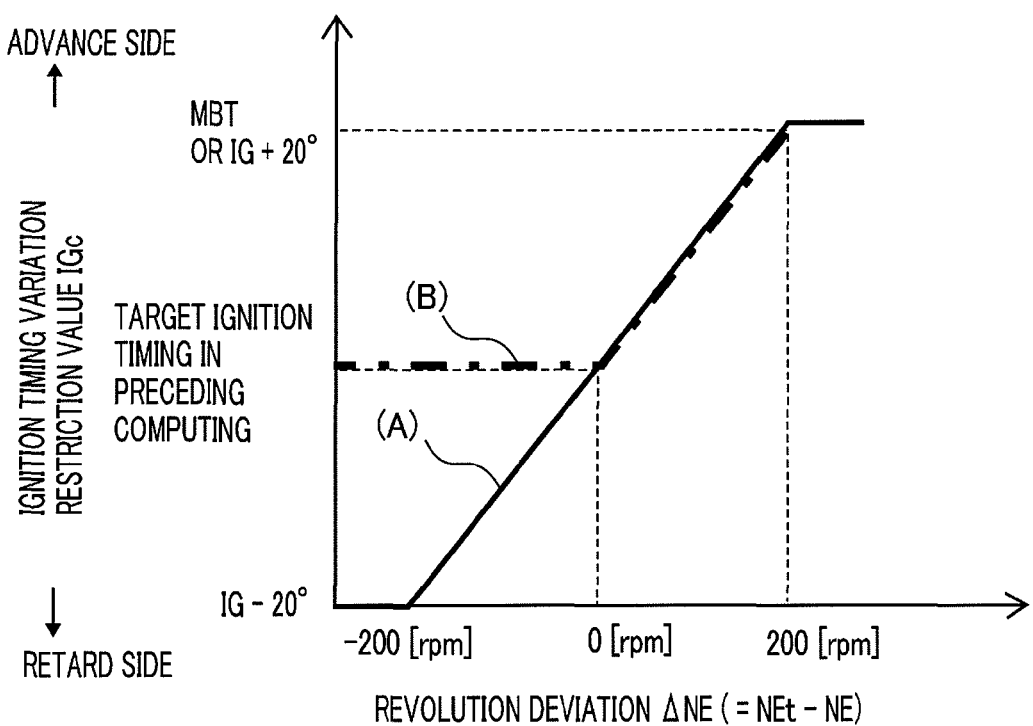
FIG. 5 is an explanatory diagram showing an example of setting an ignition timing variation restriction value IGc depending on a revolution deviation $\Delta NE$ ($=NEt-NE$)

To that end, the ignition timing variation restriction value IGc is set as a variable depending on the revolution deviation $\Delta NE$ (=NEt−NE) of the engine revolution speed NE from the target engine revolution speed NEt, as shown by the solid line (A) in FIG. 5.

Moreover, specializing in a low revolution speed state, restriction by the ignition timing variation restriction value IGc may be applied only when the revolution deviation $\Delta NE$ is larger than zero, as shown by the dotted-dashed line (B) in FIG. 5.

As described above, an idle control device for an engine according to the present invention can prevent the problem in that the target ignition timing calculated based on the intake air volume controlled in accordance with the target torque becomes a value in the retard side, regardless of the revolution speed in idling being lower than the target revolution speed, due to the discrepancy between the "ignition-timing-torque characteristics" that has been stored in the memory of the idle control device and "ignition-timing-torque characteristics" as the actual engine characteristics, so that return to the target revolution speed is delayed, thereby causing unpleasant vehicle vibration or leading to an engine stall.

Various modifications and alterations of this invention will be apparent to those skilled in the art without departing from the scope and spirit of this invention, and it should be understood that this is not limited to the illustrative embodiments set forth herein.

What is claimed is:

1. An idle control device for an engine, comprising:
an idle detection means for detecting that the engine is in an idle state;
a revolution speed detection means for detecting a revolution speed of the engine;
a target revolution speed computing means for computing a target revolution speed when the engine is in the idle state;
an intake air volume detection means for detecting an intake air volume the engine draws in;
a target torque computing means for computing target torque when the engine is in the idle state;
a target ignition timing computing means for computing, based on the revolution speed, the intake air volume and the target torque, a target ignition timing for producing the target torque with the intake air volume;
an ignition timing variation restriction means for setting an ignition timing restriction value by which variation in the target ignition timing is restricted based on the revolution speed, the target revolution speed and the target torque, and for determining an ignition timing after restricted by the ignition timing restriction value to be a final ignition timing;
a high-speed response torque control means for driving an ignition coil in a controlled manner so that a spark is started by a spark plug at the final ignition timing;
a target ignition timing torque computing means for computing, based on the revolution speed, the intake air volume and the target ignition timing, target ignition timing torque produced at the target ignition timing;
a torque ratio computing means for computing a ratio (torque ratio) of the target ignition timing torque to the target torque;
a target torque for low-speed response computing means for computing target torque for low-speed response based on the target torque and the torque ratio;

a basic ignition timing computing means for computing a basic ignition timing determined according to an operation state of the engine;

a target intake air volume computing means for computing, based on the target torque for low-speed response, the revolution speed and the basic ignition timing, a target intake air volume for producing the target torque for low-speed response; and a low-speed response torque control means for controlling an opening degree of a throttle valve so that the intake air volume coincides with the target intake air volume.

2. An idle control device for an engine according to claim 1, wherein the ignition timing variation restriction means restricts variation of the target ignition timing toward a retard side at least when the revolution speed is lower than the target revolution speed.

3. An idle control device for an engine according to claim 1, wherein the ignition timing variation restriction means corrects the ignition timing variation restriction value based on a deviation of the revolution speed from the target revolution speed.

* * * * *

UNITED STATES PATENT AND TRADEMARK OFFICE
CERTIFICATE OF CORRECTION

PATENT NO. : 8,307,807 B2
APPLICATION NO. : 13/073431
DATED : November 13, 2012
INVENTOR(S) : Takahiko Ono It is certified that error appears in the above-identified patent and that said Letters Patent is hereby corrected as shown below:

In the Specification

<u>Column 6, lines 63-64:</u> delete "the engine revolution speed NE detected by the revolution speed detection means 21" and insert --the target revolution speed NEt determined by the target revolution speed computing means 23--.

Signed and Sealed this
Second Day of July, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,307,807 B2
APPLICATION NO. : 13/073431
DATED : November 13, 2012
INVENTOR(S) : Takahiko Ono Page 1 of 2

It is certified that error appears in the above-identified patent and that said Letters Patent is hereby corrected as shown below:

In the Drawings

Figure 2B:
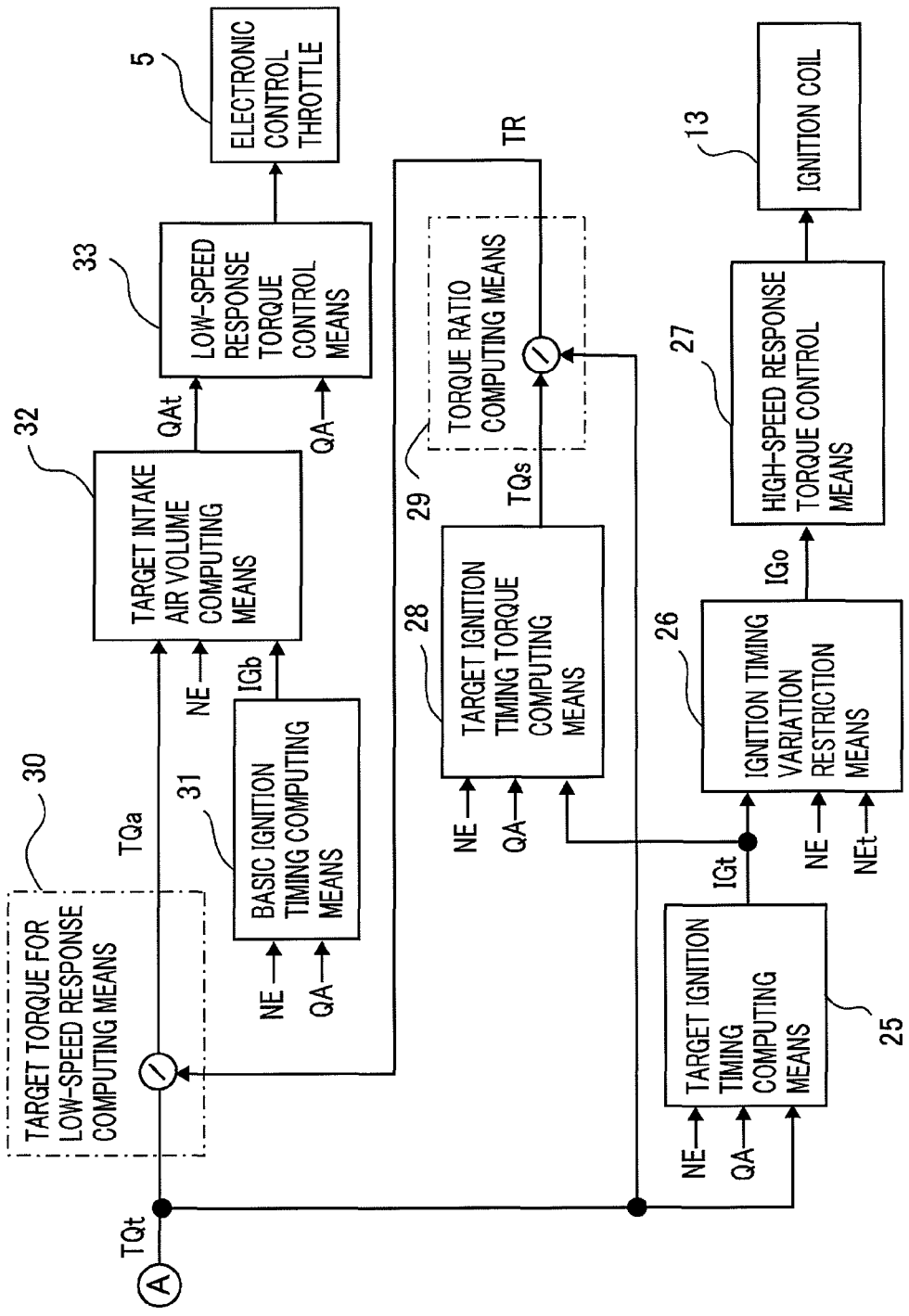

Fig 2B: delete "NE" and insert --NEt-- as indicated in the figure:

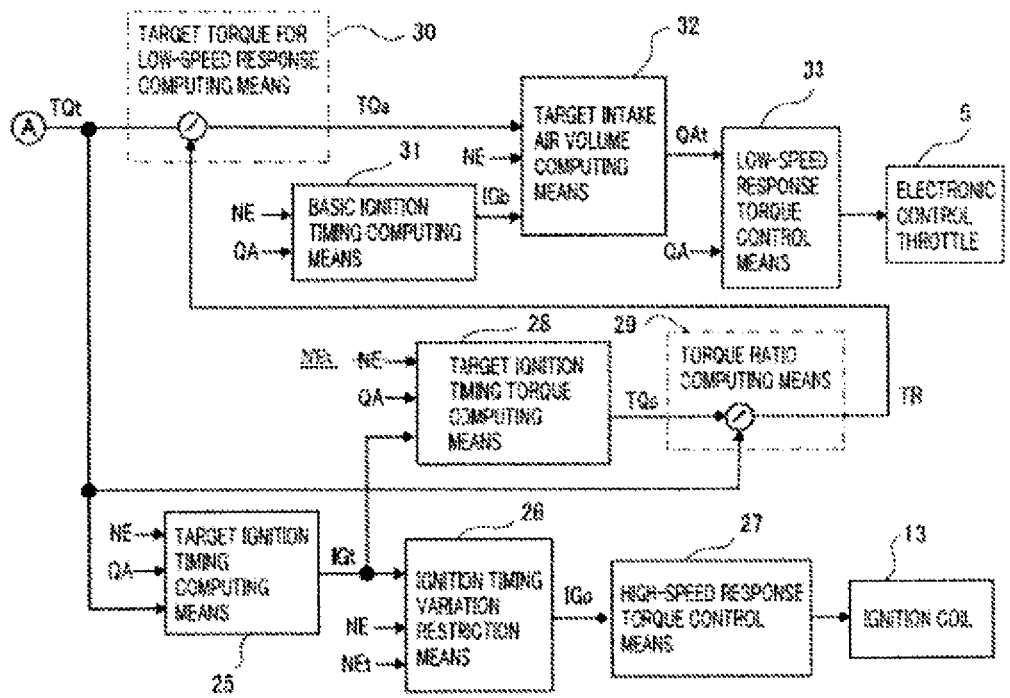

This certificate supersedes the Certificate of Correction issued July 2, 2013.

Signed and Sealed this
Thirteenth Day of August, 2013

Teresa Stanek Rea
*Acting Director of the United States Patent and Trademark Office*

CERTIFICATE OF CORRECTION (continued)

U.S. Pat. No. 8,307,807 B2

In the Specification

Column 6, lines 63-64: delete "the engine revolution speed NE detected by the revolution speed detection means 21" and insert --the target revolution speed NEt determined by the target revolution speed computing means 23--.